US005160684A

United States Patent [19]

Misawa

[11] Patent Number: 5,160,684

[45] Date of Patent: Nov. 3, 1992

[54] METHOD FOR EXTRUDING CERAMIC MULTI-LAYER STRUCTURAL BODIES

[75] Inventor: Hidenobu Misawa, Nagoya, Japan

[73] Assignee: NGK Insulators, Ltd., Japan

[21] Appl. No.: 639,390

[22] Filed: Jan. 11, 1991

Related U.S. Application Data

[63] Continuation of Ser. No. 406,049, Sep. 12, 1989, abandoned.

[30] Foreign Application Priority Data

Sep. 22, 1988 [JP] Japan ............................... 63-236596

[51] Int. Cl.[5] ............................................. B32B 31/30

[52] U.S. Cl. ............................... 264/173; 264/177.11; 264/177.16; 264/209.2

[58] Field of Search ................ 264/173, 177.11, 177.1, 264/177.14, 177.16, 209.2, 209.8, 171; 425/133.1, 131.1

[56] References Cited

U.S. PATENT DOCUMENTS

| | | | |
|---|---|---|---|
| 1,978,163 | 10/1934 | Megow | 425/133.1 |
| 3,485,912 | 12/1969 | Schrenk et al. | 264/171 |
| 3,959,432 | 5/1976 | Wiley | 156/244.11 |
| 4,256,686 | 3/1981 | Froschauer et al. | 264/209 |
| 4,861,536 | 8/1989 | Graf et al. | 264/108 |

FOREIGN PATENT DOCUMENTS

| | | | |
|---|---|---|---|
| 3517779 | 5/1985 | Fed. Rep. of Germany | 264/171 |
| 021223 | 7/1978 | Japan | 264/171 |
| 21913 | of 1901 | United Kingdom . | |
| 985310 | 3/1965 | United Kingdom | 264/171 |

*Primary Examiner*—James Lowe
*Assistant Examiner*—Christopher A. Fiorilla
*Attorney, Agent, or Firm*—Parkhurst, Wendel & Rossi

[57] ABSTRACT

A method and apparatus for shaping ceramic multi-layer structural bodies by extruding through a die. Ceramic molding compounds having different properties are fed under pressure, united and integrated in an extruding apparatus, while thicknesses of layers of the respective ceramic molding compounds are controlled by adjusting extruding pressures of the respective ceramic molding compounds. The extruding apparatus includes a die having a tip end opening of a given shape corresponding to the structural bodies to be extruded, a first extruding means capable of feeding a ceramic molding compound to the die under a given pressure, and a second extruding means for feeding another ceramic molding compound to the die. The another ceramic molding compound is different from that to be extruded through the first extruding means. The second extruding means is provided separately from the first extruding means.

3 Claims, 3 Drawing Sheets

METHOD FOR EXTRUDING CERAMIC MULTI-LAYER STRUCTURAL BODIES

This is a continuation of application Ser. No. 07/406,049 filed Sep. 12, 1989, now abandoned.

BACKGROUND OF THE INVENTION

1. Field of the Invention

The present invention relates to a method and an apparatus for extruding ceramic multi-layer structures, in which integral ceramic multi-layer structural bodies can be obtained by a single extrusion step from molding ceramic compounds having different compositions, grain sizes, color tones, etc.

2. Related Art Statement

Conventionally, two-layer structural bodies in which ceramics having different properties such as different compositions, grain sizes, water contents, viscosities, color tones, porosities, etc. are laminated in the form of two layers are employed for various uses.

These multi-layer structural bodies are each integrally produced by forming a ceramic shaped body as a base layer, and then coating another ceramic layer on the ceramic shaped body. For instance, in order to produce a cylindrical two-layer structural body, a cylindrical ceramic shaped body is extruded or compression-molded as a base, and then another layer is formed on the thus shaped cylindrical ceramic body by dipping, brushing, or spraying a ceramic slurry.

For this purpose, at least two steps are employed: an extrusion step or a compression molding step and a coating step are required to produce ceramic two-layer structural bodies, so that the number of the steps unfavorably increases. In addition, it is impossible to easily control the thickness of a coated layer in the coating step and a mixing state of a boundary layer. Furthermore, it is difficult to form a ceramic thin layer with a high viscosity slurry by dipping, brushing or spraying.

SUMMARY OF THE INVENTION

It is an object of the present invention to solve the above-mentioned problems, and to provide a method and an apparatus for extruding ceramic multi-layer structural bodies, in which multi-layer ceramic structural bodies can be obtained by a single extrusion step, and the thicknesses of layers and the state of a boundary layer can easily be controlled.

The present invention relates to a method for shaping ceramic multi-layer structural bodies by extruding ceramic molding compounds having different properties through a die, and is characterized in that the ceramic molding compounds having different properties are separately extruded, and united together in an extruder, and thicknesses of layers made of the respective ceramic molding compounds having different properties are controlled by adjusting extruding pressures of the respective layers.

The apparatus for extruding ceramic multi-layer structural bodies according to the present invention comprises a die having an opening corresponding to a given shape of extruded products, a first extruding means capable of feeding a ceramic molding compound to the die under a given pressure, and a second extruding means separately provided from the first extruding means and adapted to feed a ceramic molding compound, which is different from that to be fed under pressure by the first extruding means, to the die under another given pressure.

According to the above construction, the molding compounds having different compositions, grain sizes, water contents, viscosities, color tones, etc. are independently extruded, and united, laminated and integrated together inside the extruding apparatus, thereby obtaining the multi-layer structural bodies. Furthermore, by adjusting extruding pressures of the respective layers, the thicknesses of the layers are controlled. Thus, the multi-layer structural body in which the thickness of each of the layers is controlled can be obtained by a single extruding step. In addition, the mixed state of a boundary layer between the molding compounds can also be controlled by varying the uniting location of the molding compounds having different properties in the die.

Moreover, according to the extruding apparatus of the present invention, the ceramic molding compounds having different properties are separately extruded under given pressures thereof by providing the first and second independent extruding means. Thus, the above-mentioned extruding method can favorably be achieved by this extruding apparatus.

These and other objects, features and advantages of the invention will be appreciated upon reading the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
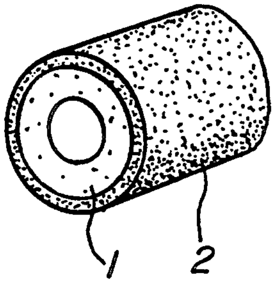
FIG. 1 is a perspective view illustrating the structure of an embodiment of the two-layer ceramic structural body according to the present invention.

FIG. 1 is a perspective view illustrating an embodiment of the two-layer structural body of the ceramic multi-layer structural bodies according to the present invention. In the two-layer structural body shown in FIG. 1, onto an outer peripheral surface of a hollow cylindrical inner layer 1 is provided an outer layer 2 having a uniform thickness and different properties from those of the first layer. In this embodiment, a dust-removing ceramic filter may be formed by varying porosity between the inner layer 1 and the outer layer 2.

Figure 2:
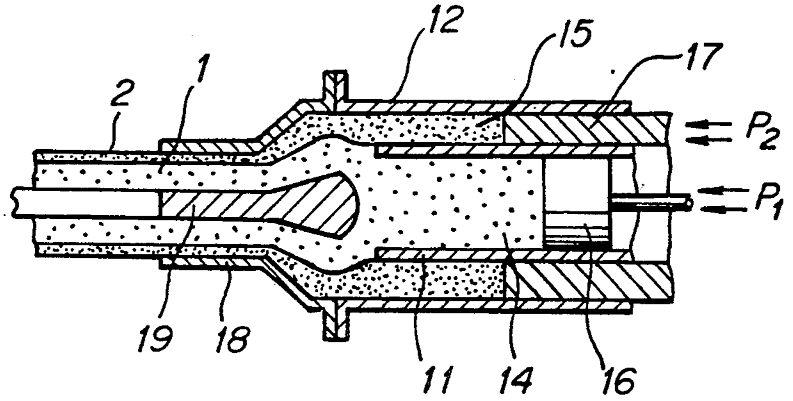
FIG. 2 is a view illustrating an embodiment of the extruding apparatus favorably used for extruding the ceramic multi-layer structural body having the shape shown in FIG. 1.

FIG. 2 is a view of illustrating the structure of an embodiment of an extruding apparatus favorably used for extruding the ceramic two-layer structural body having the shape shown in FIG. 1. In the extruding apparatus shown in FIG. 2, it is preferable that an inner cylinder 11 is provided concentrically with an outer cylinder 12. Ceramic molding compounds 14 and 15 having different properties are fed in the inner cylinder 11 and a space between the inner and outer cylinders 11 and 12, respectively. Pistons 16 and 17 are provided for extruding the ceramic molding compounds 14 and 15, respectively. A first extruding means is constituted by the inner cylinder 11 and the piston 16, while a second extruding means is constituted by the outer cylinder 12 and the piston 17. A die 18 having an end of a given cylindrical shape is connected to an end of the outer cylinder 12. The end of the inner cylinder 11 is arranged at a given location adjustable relative to the die 18. In this embodiment, since the inner layer 1 is made cylindrical in the shape of a tube, a core 19 is arranged in the center of the die 18 to obtain a hollow cylindrical shape of products. In the extruding apparatus shown in FIG. 2, assume that pressures applied to the pistons 16 and 17 are taken as $P_1$ and $P_2$, respectively. When $P_1$ is made smaller than $P_2$, the thickness of the outer layer 2 can be made greater, while when $P_1$ is made greater than $P_2$, the thickness of the outer layer 2 can be made smaller.

Figure 3:
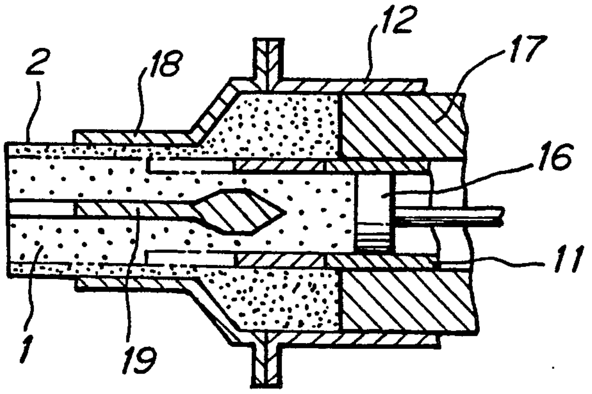
FIG. 3 is a view illustrating a way of controlling a boundary face in the extruding apparatus shown in FIG. 2.

FIG. 3 is a view illustrating a way of controlling a boundary face between the inner layer 1 and the outer layer 2 for the extruding apparatus shown in FIG. 2. That is, when the end of the inner cylinder 11 is located nearer the die 18 in FIG. 2, the ceramic molding compound 14 is less likely to mix into the ceramic molding compound 15 at the boundary face. When the end portion of the inner cylinder 11 is located remote from the die 18 in FIG. 2, the ceramic molding compound 14 is easily mixed into the ceramic molding compound 15 at the boundary face.

By controlling the thickness of the outer layer 2 with the pressure of the piston and controlling the boundary face through adjusting the location of the end portion of the inner cylinder 11 as mentioned above, the thickness and the state of the boundary face can continuously be varied. Thus, the pressure and the location of the end portion can be determined depending upon the desired thickness and the state of the boundary face.

Figure 4:
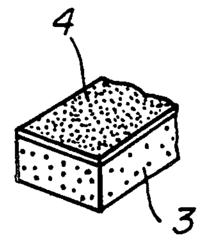
FIG. 4 is a view illustrating the structure of another embodiment of the ceramic multi-layer structural body according to the present invention.

FIG. 4 is a perspective view illustrating the structure of another embodiment of the two-layer structural body among the ceramic multi-layer structural bodies. In the two-layer structural body shown in FIG. 4, a surface layer 4 is provided on a surface of a planar base layer 3. The surface layer has a uniform thickness and properties, such as a grain size, a color tone, etc., different from those of the base layer 3.

Figure 5:
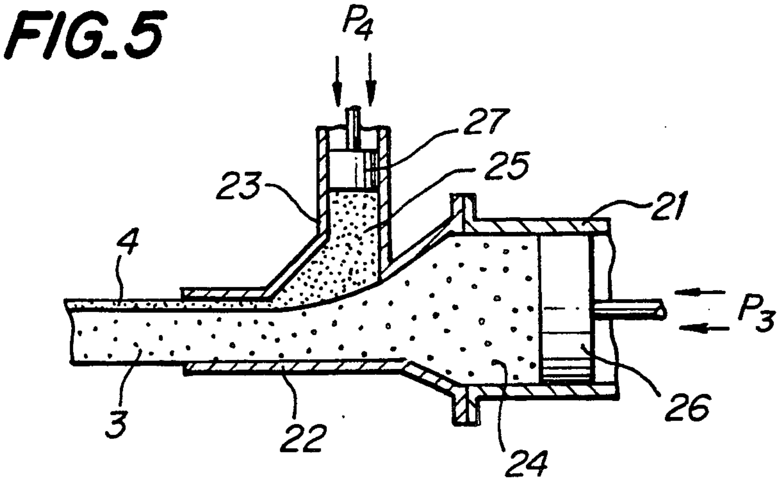
FIG. 5 is a view illustrating another embodiment of the extruding apparatus favorably used for extruding the ceramic multi-layer structural body having the shape shown in FIG. 4.

FIG. 5 is a view illustrating the structure of an extruding apparatus favorably used for extruding the ceramic multi-layer structural body shown in FIG. 4. In the extruding apparatus shown in FIG. 5, a die 22 having a tip end of a given rectangular section is provided at an end portion of a base cylinder 21, and a side cylinder 23 is located at a side wall of the die 22. Ceramic molding compounds 24 and 25 having different properties are fed into the base cylinder 21 and the side cylinder 23, respectively. A first extruding means is constituted by providing a piston 26 in the base cylinder 21, while a second extruding means is constituted by providing a piston 27 in the side cylinder 23. In the extruding apparatus shown in FIG. 5, pressures applied on the pistons 26 and 27 are taken as $P_3$ and $P_4$, respectively. When $P_3$ is smaller than $P_4$, the surface layer 4 can be made thicker. When $P_3$ is greater than $P_4$, the surface layer 4 can be made thinner.

Figure 6:
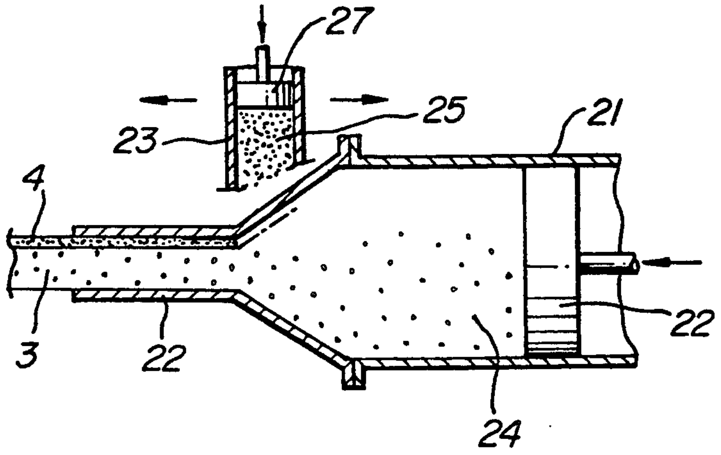
FIG. 6 is a view illustrating a way of controlling a boundary face in the extruding apparatus shown in FIG. 5.

FIG. 6 is a schematic view illustrating an example of controlling a boundary face between the base layer 3 and the surface layer 4 in the extruding apparatus shown in FIG. 5. That is, when the side cylinder 23 is positioned at a location nearer the tip end of the die 22, the ceramic molding compounds 24 and 25 are less likely to mix together at the boundary face. When the side cylinder 23 is located remote from the tip end of the die 22, the ceramic molding compounds 24 and 25 are easily mixed at the boundary face.

Figure 7:
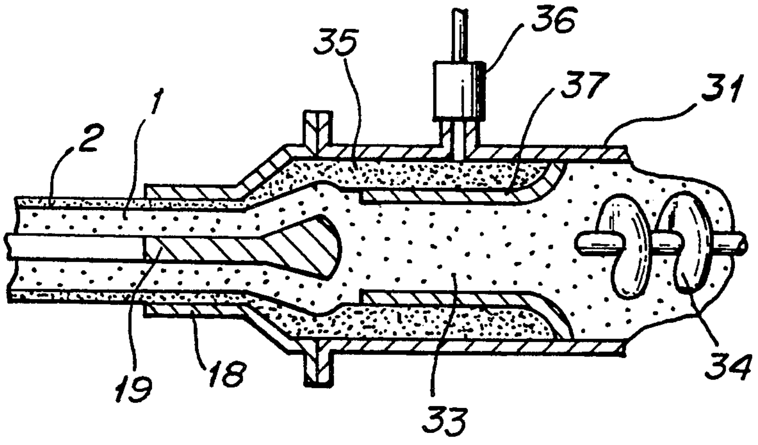
FIG. 7 is a view illustrating the structure of a further embodiment favorably used for extruding the ceramic multi layer structural bodies shown in FIG. 1.

FIG. 7 is a view illustrating the structure of another embodiment of the extruding apparatus favorably used for extruding the ceramic multi-layer structural body shown in FIG. 1. In the embodiment shown in FIG. 7, a reservoir section 32 is formed in a base cylinder 31. A first extruding means is constituted by connecting a screw feeder 34 to the base cylinder 31 for extruding the ceramic molding compound 33. A second extruding means is constituted by connecting a feeder 36 to the reservoir section 32 for continuously feeding the ceramic molding material 35 into the reservoir section under a given pressure. In the extruding apparatus shown in FIG. 7, as is the same with the above-mentioned embodiments, it is not only possible to control the thickness of the outer layer 1 due to the extruding pressure but also to control the mixed state in the boundary layer by varying the location of the end portion of the reservoir section 32. Thus, ceramic two-layer structural bodies can continuously be obtained.

The present invention is not limited to the above-mentioned embodiments only, and various modifications, variations and changes could be made. Although tubular or planar two-layer structural bodies have been explained by way of examples in the above-mentioned embodiments, but the invention will not be limited to them. It goes without saying that the present invention can favorably be applied to two-layer structural bodies having different shapes, and also to multi-layer structural bodies and the like in addition to the two-layer structural bodies.

As is clear from the above-detailed explanation, according to the method and the apparatus for extruding the ceramic multi-layer structural bodies in the present invention, the multi-layer structural bodies are obtained by independently extruding, uniting, laminating and integrating molding compounds having different properties, and the thicknesses of the ceramic shaped layers having the different properties can be adjusted by controlling the extruding pressures of them. Thereby, the multi-layer structural bodies in which the thicknesses of the respective layers are controlled can be obtained by a single extruding operation.

What is claimed is:

1. A method of shaping hollow ceramic multi-layer structural bodies by extruding ceramic molding compounds having respectively different properties through a die using an extrusion apparatus, the method comprising the steps of:

separately feeding and extruding the ceramic molding compounds under pressure through an inner cylinder and a space between the inner cylinder and an outer cylinder, respectively;

forming a hollow portion of the hollow structural bodies by passing the ceramic molding compounds around a core which is centrally arranged in the die such that an axially outer end of said core is substantially flush with an opening of the die; and forming layers having variable thicknesses by adjusting only extruding pressures of each of the respective ceramic molding compounds thereby forming said ceramic multi-layer structural body inside said extrusion apparatus.

2. A method of shaping hollow ceramic multi-layer structural bodies by extruding ceramic molding compounds having respectively different properties through a die using an extrusion apparatus, the method comprising the steps of:

separately feeding and extruding the ceramic molding compounds under pressure through an inner cylinder and a space between the inner cylinder and an outer cylinder, respectively;

forming a hollow portion of the hollow structural bodies by passing the ceramic molding compounds around a core which is centrally arranged in the die such that an axially outer end of said core is substantially flush with an opening of the die;

forming layers having variable thicknesses by adjusting only extruding pressures of each of the respective ceramic molding compounds thereby forming said ceramic multi-layer structural body inside said extrusion apparatus; and mixing the ceramic molding compounds in varying degrees by varying an axial location of an end of the inner cylinder during extrusion.

3. The method of claim 2, wherein the degree of mixing of the boundary layer is greater when the end of the inner cylinder is located remote from the opening of the die compared to when the end of the inner cylinder is located near the opening of the die.

* * * * *